United States Patent
Spirkowyc et al.

(10) Patent No.: US 6,822,024 B1
(45) Date of Patent: Nov. 23, 2004

(54) COMPOSITION OF AN EXTRUDABLE PVC SUBSTRATE, FOR MANUFACTURING FULL WIDTH PRINTABLE BILLBOARDS

(75) Inventors: Paul Alan Spirkowyc, Rock Hill, SC (US); Dattatreya Ramesh Panse, Warwick, RI (US)

(73) Assignee: Cooley, Incorporated, Pawtucket, RI (US)

(*) Notice: Subject to any disclaimer, the term of this patent is extended or adjusted under 35 U.S.C. 154(b) by 12 days.

(21) Appl. No.: 10/310,435

(22) Filed: Dec. 5, 2002

Related U.S. Application Data

(60) Provisional application No. 60/336,622, filed on Dec. 4, 2001.

(51) Int. Cl.$^7$ .............................. C08K 3/10; C08K 3/32; C08K 3/26
(52) U.S. Cl. ...................... 524/109; 524/409; 524/413; 524/425; 524/434; 524/513; 524/523; 428/518
(58) Field of Search ................................. 524/109, 409, 524/413, 425, 434, 513, 523; 428/518

(56) References Cited

U.S. PATENT DOCUMENTS

| | | |
|---|---|---|
| 4,083,789 A | 4/1978 | Morgan et al. |
| 4,100,325 A | 7/1978 | Summers et al. |
| 4,255,320 A | 3/1981 | Brecker et al. |
| 4,380,597 A | 4/1983 | Erwied et al. |
| 4,390,585 A | 6/1983 | Holden |
| 4,978,700 A * | 12/1990 | Haygood .................... 524/156 |
| 5,030,676 A | 7/1991 | Wallen |
| 5,194,470 A | 3/1993 | Carette et al. |
| 5,744,525 A | 4/1998 | Harvey et al. |

* cited by examiner

Primary Examiner—Kriellion A. Sanders
(74) Attorney, Agent, or Firm—Dougherty, Clements & Hofer

(57) ABSTRACT

A composition of a compounded PVC substrate that is suitable as an extrudate in very wide extruders. The composition is for use as a coating on scrim in the manufacture of billboards, wherein the composition does not yellow or burn, even in extruders having a die 215 inches wide (5,486 mm) with a 1.5 to 2.0 mm lip opening average. The composition has excellent printability, weather resistance and a price point that is low enough to meet competition. The composition has minimal quantities of lubricants and other processing aids, and utilizes a PVC suspension resin having high porosity. The invention enables the fabrication of printable billboard sheeting that is seamless.

22 Claims, No Drawings

COMPOSITION OF AN EXTRUDABLE PVC SUBSTRATE, FOR MANUFACTURING FULL WIDTH PRINTABLE BILLBOARDS

CROSS REFERENCE TO RELATED APPLICATION

This application claims the benefit of the prior filing date of U.S. Provisional Patent Application No. 60/336,622, filed Dec. 4, 2001.

FIELD OF THE INVENTION

The present invention relates generally to a composition for billboard sheeting. More particularly, the invention relates to a composition of a compounded PVC substrate for printable billboard sheeting, wherein said composition has excellent weathering, printability, colorfastness, fungicidal durability, extruder processability, non-flammability and thermal stability, where the processability and thermal stability are sufficient to form a full width billboard sheet that is seamless. The seamless billboard sheet is produced on exceptionally wide converting lines utilizing a full width extruder die.

BACKGROUND OF THE INVENTION

In the past, roadside printable billboards have been typically plastered with imaged paper and/or canvas sheeting. Today most of the paper and canvas sheeting has been replaced with plastic sheeting that is substantially a polyester scrim coated with a substrate. The substrate is comprised of a compounded PVC. There are substantially three methods used to form the sheeting. A first method is to apply multiple coats of plastisol of PVC onto the scrim. A second method is to laminate two extruded PVC films to an interposed scrim using a plastisol of PVC. A third method is to extrude, onto the scrim, a PVC composition. The latter method is preferred over applying plastisols because, generally, it is easier to print on extruded PVC than on a film formed from a PVC plastisol. The reader is reminded that a PVC plastisol is substantially a plasticizer into which is dispersed PVC. Many additives may be incorporated into the dispersion to stabilize the plastisol. In the first method, after coating the plastisol onto the scrim, the coating is heated to a temperature where the PVC and the plasticizer become miscible, whereupon the system inverts and the PVC absorbs the plasticizer. A drawback to PVC plastisols is that the additives in plastisol formulations can interfere with the printing process. The plasticizer and the additives can affect the surface tension and form a thin layer where there is poor adhesion. Another source of compounds that can interfere with printing originate from the PVC polymer. PVC plastisol formulations are compounded with emulsion PVC resins. Residual emulsifiers (soaps) from the emulsion polymerization are by design not soluble in the PVC, and their presence on the surface of the sheet can negatively impact the wetting characteristics. Plasticizers and additives tend to migrate through filmic PVC, so that even billboard sheeting prepared using the second method has similar printing issues, as the plasticizers and additives migrate to the surface. Furthermore, if the extruded PVC of the second method is compounded with lubricants that are subject to plating out, (i.e. polyethylene waxes, metallic soaps and amide waxes), the surface of the PVC film has poor printability. A major advantage of plastisols is that they can be used to coat very wide webs. Wide webs are desired because full billboard width will be seamless. Also, wide webs are desired because they can be cut down to narrower web widths, therein reducing the number of SKUs in the manufacturing queue. Narrower webs must be spliced together to form full billboard width sheeting, and the splices or seams are thicker than a single ply sheeting. Another problem with narrow sheets is that they are "heat seamed", using radio frequency (RF) welding, and RF welding creates a seam having potentially poor printability. Printability is affected by localized heating, which drives the additives to the surface. Poor printability causes visual distortions of the image.

As previously stated, sheeting produced using an extruded coating of compounded PVC generally has superior printing characteristics. A complicating factor is that PVC compositions are relatively thermally unstable at temperatures required for the extrusion. Uncompounded PVC starts degrading at 120° C., forming HCl gas, and the degradation is accompanied by yellowing, and losses in mechanical and rheological characteristics. Typical extrusion die temperatures are about 180° C. Thermal degradation is exacerbated with wide dies. With wide dies, the dwell time in the die lengthens, and therefore there is more time for thermal degradation. Heretofore, there has not existed a PVC composition having adequate thermal stability for exceptionally wide dies, and only narrow web extruded PVC billboard sheeting could be formed, which would then be seamed together.

A partial explanation for the difficulty in compounding a PVC composition for billboards is that in addition to having improved thermal stability, it must also have good weathering, colorfastness, fungicidal durability and be flame resistant (e.g. meet NFPA 701 vertical burn). The inclusion of additives to affect these properties has the cumulative effect of making the extrusion process even more complex and thermally challenging. For instance, in order to make the PVC composition flame resistant requires the inclusion of flame retardants, and in general, flame retardants exacerbate thermal degradation during extrusion. The PVC composition must also be compounded to be resistant to light aging, and particularly to UV light. Both flame retardants and UV stabilizers are known to cause embrittlement and yellowing during extrusion, which is unacceptable for billboard sheeting. Antimicrobials, and particularly fungicides are added to affect fungicidal durability. Biocidal agents are sensitive to heat, and loose their efficacy when exposed to high temperatures. Opacity and whitening additives are required to achieve billboard sheeting having sufficient whiteness, opacity and ink receptivity. Typically, these additives are pigments (i.e. titanium dioxide), and they like the previously enumerated flame retardants (i.e. antimony oxide) are usually powders, and their inclusion in the composition, when added to the extruder barrel can significantly increase the friction. A rule of thumb estimate is that 80% of the heat generated in an extruder is the result of the mechanical work input into shearing and mixing the polymer. The addition of powders results in higher friction and more heat being generated. Currently, the widest billboards are approximately 18 feet (>5 meters), and so an extruder having a die length of 215 inches (5,486 mm) would be required for full width seamless sheeting.

What is needed is a composition of a compounded PVC substrate that has sufficient thermal stability and printability that a full billboard width web can be produced.

What is needed is a composition where the addition of powders, particularly inorganic powders such as antimony oxide, titanium oxide and calcium carbonate, does not result in overheating in the extruder or die.

An economic consideration is the cost of the compounded PVC substrate for printable billboard sheeting. The previously discussed additives are expensive, and a component offsetting their cost is desired. The component cannot increase friction heat, nor negatively impact other processing criteria. The component cannot cause yellowing, nor reduce flame resistance, nor resistance to weathering, nor lower fungicidal durability, nor printability, and yet still lower cost.

The reader is reminded that billboard sheeting is printed using digital printing technology and ink jet printers. Ink jet printing equipment is manufactured by a number of manufactures including Sitech, Vutech, Nur and others. Current ink jet printing equipment is capable of producing indoor as well as outdoor digitally imaged printable billboard signs over five meters (5 m) in width and having at least four (4) aesthetically pleasing colors (yellow, red, blue and black).

Pigment based inks for use in producing indoor and outdoor digitally imaged printable billboards are manufactured by a number of manufactures, including A. R. Monteith, Triangle, Inkware, Akzo, Ink Design, Nur and others. A number of solvents typically used for maintaining the various pigments in solution include: lactic acid, propionic acid, methyl ethyl ketone (MEK), cyclohexanone, 4-hydroxy4-methyl-2-pentanone, methyl-2-pyrrolidone, butyl ester, 2-hydroxy ethyl ester, ethylene glycol monobutyl ether, propylene glycol mono methyl ether, acetate, ether acetate, ethylene glycol monobutyl ether acetate, propylene glycol methyl ether acetate, butyl benzyl phthalate, ethyl-3-ethoxypropionate and aromatic naphta.

Morgan et al. in U.S. Pat. No. 4,083,789, teaches a series of PVC compositions that are compounded to reduce smoke and flame emissions. The master formulation contains 100 parts by weight PVC, 55 parts plasticizer, 3 parts epoxidized linseed oil, 2 parts Ba—Cd complex (stabilizer), and 12 parts of filler. Various fillers are disclosed. They include calcium carbonate, aluminum trihydrate, magnesium oxide, and kaolin. Various plasticizers are examined. They include brominated, chlorinated, and other halogenated phosphorus esters. A particularly useful composition contained Dawsonite.

Carette et al. in U.S. Pat. No. 5,194,470, discloses compositions for stabilizing chlorinated polymers. The PVC compositions utilized a minimum quantity of epoxidized oils. Present were organic zinc compounds, and additionally there were organic calcium, magnesium, barium or mixtures thereof; admixed with the PVC. Not mentioned were Ba—Zn compounds, nor Montan wax, nor the utility of using perchlorates, or biocides like 10,10-oxybisphenoxarsine.

J. Michael Wallen in U.S. Pat. No. 5,030,676, discloses a UV light stabilizer PVC composition. The composition has titanium dioxide, which is an excellent UV stabilization system, and manganese oxide. The manganese oxide is less than the titanium and still imports similar color and UV stability.

Erwied et al. in U.S. Pat. No. 4,380,597, discloses a PVC composition stabilized with aliphatic polyhydroxyl compounds containing 4 to 6 OH-groups per 100 parts by weight of polymer. These polyhydroxyl compounds should contain at least one carboxyl and/or carbonyl group and/or double bond. Suitable compounds are gluconic acid, glucuronic acid, ketogluconic acid, ascorbic acid or the alkali metal salts, or alkaline earth salts of the mentioned acids. Other conventional processing additives may be present. The invention is also a process for the manufacture of pipes, profiles, foils, hollow parts by hot forming, with the use of the mentioned additives, and the additional use of paraffin, free fatty acid, epoxidized soybean oil or higher molecular weight ester wax.

In a landmark patent Brecker et al. in U.S. Pat. No. 4,255,320, discloses mixtures of monoalkyltin 2-acyloxyethylmercaptide and/or a dialkyltin 2-acyloxyethylmercaptide in admixture with an alkyltin sulfide to stabilize PVC compositions. Specific sulfides mentioned are n-butyl tin sesquisulfide, n-octyltin sesquisulfide, methyltin sesquisulfide, 2-ethylhexyltin sesquisulfide, isobutyltin sesquisulfide, and n-dodecyltin sesquisulfide.

Summers et al. in U.S. Pat. No. 4,100,325, discloses a weather resistant PVC composite. Weather resistance is improved by admixing PVC with gelled polyacrylates. It is apparent that because acrylate is gelled the PVC and the acrylate would not be miscible. Acrylates are known to have good weather resistance, and functionally act principally to affect UV light absorption.

Harvey et al. in U.S. Pat. No. 5,744,525, discloses PVC compositions having impact modifiers, montanic esters, hydrogenated castor oil, tin compounds, and in some cases zinc oxide, titanium dioxide and flame retardants. Cited examples of flame retardants include antimony trioxide, aluminum hydroxide and zinc stannate. Harvey '525 achieved the greatest stability when N-phenyl-3-acetylpyrrolidine-2-4-dione was added to the PVC composition. Of particular interest are the heat ageing properties as judged through the yellowness index of the variance permeation and combinations disclosed by Harvey '525. Vinyl chloride resins are thermally stabilized by incorporating a heterocyclic compound, which when in the radical, A=S, are thiophene derivatives, when A=NR, are pyrrolidone derivatives, and when A=O, are derivatives of polyethyleneoxide-propyleneoxide-ethylenediamine (e.g. Tetroni® compounds which is a BASF trademark). The disclosure does not teach how the compositions will handle in extruder die, nor does it address the issues of flammability and printability.

Holden in U.S. Pat. No. 4,390,585, teaches the method for forming a durable flexible membrane. The durable flexible membrane has a UV stabilizer, which is 2-hdyroxy4-n-oxtyl-benxophenone, and a fungicide which is 2-n-oxty-4-isothiazoline and a fire retardant, which is antimony oxide. Holden '585 discloses that the additives are coated as a dispersion in a plasticizer, and then the coating is heated in an oven.

SUMMARY OF THE INVENTION

The present invention is a composition which is a compounded PVC substrate, where the compounded PVC substrate is suitable as an extrudate in very wide extrusion dies. The composition is particularly suited for printable billboards. The present invention is also the composition that further comprises a scrim, where said composition comprising a scrim is a very wide printable billboard sheet. The present invention prevents printing defects from occurring due to inconsistencies and non-uniformities in the printing surface of a printable billboards sheeting. The composition is a PVC based formulation, compounded to have excellent thermal stability, good processability, weather resistance, flame resistance, good uniformity, and fungicidal durability. Typically, the dies are in the neighborhood of 215 inches (5,461 mm) wide with an average lip opening of 1.5 to 2.0 mm. The composition does not burn, and has only minimal lubrication additives. The composition is also suitable for narrower width dies, such as 1 inch (25.4 mm), and any intervening width.

The PVC composition is comprised of PVC, preferably a suspension resin of PVC having high porosity. The high porosity improves printability, as ink jet inks are partially absorbed by the resin. A preferred PVC is Oxyvinyl's PVC homopolymer 240FG.

The PVC resin is plasticized. A combination of plasticizers is generally used. One group of plasticizers is alkyl phthalates, and particularly diisodecyl phthalate (DIDP). Another preferred plasticizer is epoxidized soybean oil, ESO. The composition additionally contains a filler such as clay, silicate, talc and calcium carbonate. A preferred filler is calcium carbonate. The calcium carbonate is relatively porous and acts to improve ink receptivity, and the carbonate is basic and serves as a buffer to absorb HCl that may be formed during extrusion. Billboard sheeting is generally white, and the composition contains a colorant that imparts color to the sheeting. The colorant can be added to the composition in the form of a color concentrate comprising an opacifier, a whitener and a blue toner or as a PVC masterbatch or as individual components. Generally, the color concentrate is comprised substantially of titanium dioxide ($TiO_2$), blue toners and optical brighteners. Color concentrates, in the form of PVC masterbatches, typically are compounded with a carrier PVC and additional stabilizers and additives to prevent degradation and augment compounding. Titanium dioxide imparts UV stability, as well as opacity and whiteness. Applicant recognizes that other pigments, such as barium oxide, and other whitening pigments can be used in combination with titanium dioxide or in substitution thereof. A preferred optical brightener is Uvitex®OB (2,5-thiophenedyl-bis(5-tert-butyl-1,3-benzoxazole) made by Ciba Specialty Chemicals. The composition also contains a flame retardant. Examples of suitable flame-retardants include antimony trioxide and brominated compounds. The preferred flame retardant is antimony trioxide. The PVC, plasticizer, filler, color concentrate and flame retardant account for about 95% of the composition of the formula. The remaining components are comprised of: a.) biocides, and more particularly fungicides such as 10,10-Oxybisphenoxarsine; b.) rheological processing aides, which are substantially polymeric acrylates, such as Rohm & Haas Paraloid® K-120N, K-120ND, and K-175; c.) vinyl stabilizers, which are predominately barium-zinc stabilizers, such as Witco Chemicals Mark® 4824,4848 and 4845; d.) lubrication processing aids, and particularly Licowax® OP powder, a registered product of Clariant GmbH, which is the ester of montanic acids; e.) generic stabilizers, for instance, a thermal stabilizer such as Irganox® 1076 (octadecyl 3,5-di-(tert)-butyl-4-hydroxyhydrocinnamate), made by Ciba Specialty Chemicals, and a UV stabilizer such as Ciba Specialty Chemicals Tinuvin® 622LD (butanedioic acid, dimethylester polymer with 4hydroxy-2,2,6,6-tetramethyl-1-piperdine ethanol); and f.) perchlorate stabilizers, such as Witco Chemicals Mark 6087ACM®.

The composition is compounded off line using low shear mixing, such as Banbury mill or roll mill technology, wherein all the ingredients are combined, thoroughly mixed, slabbed and formed into pellets. The pellets are typically dried under slight vacuum.

The composition can be extruded onto a scrim, where the scrim is formed from yarns selected from the group consisting of: polyesters, nylons, polypropylenes, polyamides, polyimides, polyethylenes, cellulosic materials, glasses, polyacrylics, polycarbonates, polyacetals and ketals, polyurethanes, copolymers and terpolymers, and blends thereof. The resulting composition comprises a compounded PVC substrate and the scrim. The composition is reinforced by the scrim, a the scrim adds dimensional stability, and is a reinforced composition suitable for manufacture of very wide printable billboard sheets.

OBJECTS OF THE INVENTION

The principal object of the present invention is to provide a composition that is a PVC based substrate having excellent thermal and printing properties, where the composition can be extruded through very wide extrusion dies with so little degradation that there is substantially no yellowing, reduced biocidal durability, deteriorated mechanical properties, nor lowered weather resistance. An example of an exceptionally wide die is a 215 inches (5,486 mm) long, having an average lip opening of 1.5 to 2 mm.

A second object of the invention is to form a full width billboard sheet by extrusion coating a scrim with at least one coating of the composition.

A third object of the invention is to form a full width billboard sheet that has minimal stress induced curling or puckering, wherein there is minimal drawing during extrusion coating and the sheet is annealed.

A fourth object of the invention is to form a full width billboard sheet that has a smooth uniform surface and thickness.

A fifth object of the present invention is to provide a reinforced composition that is a scrim coated with an extrudable PVC based substrate that is suitable for printing.

DETAILED DESCRIPTION

The invention is a composition of a compounded PVC substrate, that by weight percent comprises from about 46% to about 53% PVC, from about 17% to about 24% plasticizer, from about 12% to about 17% of filler, from about 7% to about 10% of color concentrate, from about 1.5% to about 5% of flame retardant, from about 1.2% of Ba—Zn to about 4% of Ba—Zn vinyl stabilizer, from about 0.02% to about 0.1% of lubrication processing aides, from about 0.4% to about 2% of thermal/UV stabilizer, and from about 0.2% to about 0.4% of perchlorate stabilizer.

A preferred PVC is a suspension resin of PVC having high porosity, for instance Oxyvinyl's PVC homopolymer 240FG.

Preferred plasticizers are alkyl phthalates, and particularly diisodecyl phthalate (DIDP). Another preferred plasticizer is epoxidized soybean oil, ESO.

Suitable fillers are selected from the group consisting of: clay, silicate, talc and calcium carbonate. Calcium carbonate is relatively porous and acts to improve ink receptivity, and the carbonate is basic and serves as a buffer to absorb HCl that may be formed during extrusion and is available in fine grains at acceptable pricing.

The color concentrate contains an opacifier, a whitener and a blue toner. Generally, the color concentrate is comprised substantially of titanium dioxide ($TiO_2$), and blue toners. Titanium dioxide additionally imparts UV stability. Also present are optical brighteners, and a preferred optical brightener is Uvitex ®OB (2,5-thiophenedyl-bis(5-tert-butyl-1,3-benzoxazole) made by Ciba Specialty Chemicals.

The preferred flame retardant is antimony trioxide. Brominated compounds can also be added in small amounts, but generally to not have the color stability of antimony trioxide. Phosphorus compounds, such as carboxyphosphinic acids, anhydrides of these, dimethyl methylphosphonate and phospholane products are generally found to be workable, but more hydroscopic than antimony trioxide, and therefore less desirable.

Lubrication processing aids are generally of internal lubricant type, and include ester of montanic acids. A particularly facile lubricant is Licowax® OP powder, a registered product of Clariant GmbH, which acts as a internal as well as external lubricant, but in contrast to other common external lubricants, Licowax doesn't affect printability. External lubricants such as polyethylene waxes, and alkaline earth and amides of stearic acid are to be avoided.

Thermal stabilizers (e.g. antioxidants) are selected form the phenolic based stabilizer type, such as Irganox® 1076 which is octadecyl 3,5-di-(tert)-butyl4-hydroxyhydrocinnamate. Irganox 1076 is made by Ciba Specialty Chemicals. An efficacious UV stabilizer is Tinuvin® 622LD, which is butanedioic acid, dimethylester polymer with 4-hydroxy-2,2,6,6-tetramethyl-1-piperdine ethanol). Tinuvin is a manufactured by Ciba Specialty Chemicals.

Preferred perchlorate stabilizers are exemplified by Mark 6087ACM® made by Witco Chemicals. Mark 6087 ACM is a sodium perchlorate.

The PVC, plasticizer, filler, color concentrate and flame retardant account for about 95% of the composition of the formula.

While PVC has some intrinsic resistance to fungi, the composition preferably also contains 0% to about 3% of biocide. The biocide is preferably 10,10'-oxybisphenoxarsine cut in a carrier such as, PVC/PVA or in a plasticizer such as ESO, DIDP, BBP, or a combination thereof. 10,10' oxybisphenoxarsine is sold by Rohm and Haas under the trade name of Vinyzene®. When the carrier is a plasticizer the grade bears a BP designation (i.e. Vinyzene BP 5 is available at 2% and 5% active). When the carrier is PVC/PVA the grade bears a SB designation (i.e. Vinyzene SB 1 is available at 5% active). Other biocides that may be suitable include dichloro-octyl-isothiazoline and octyl-isothiazoline.

The composition also preferably contains from about 0% to about 3% of rheological processing aid. Suitable rheological processing aides are substantially polymeric acrylates, such as Rohm & Haas Paraloid® K-120N, K-120ND, and K-175.

Examples of the compounded PVC substrate are given in Table 1. Table 2 lists the anticipated range of the percent composition of the individual components, and the components grouped by function.

TABLE 1

| Components | Category | #1 Substrate | #2 Substrate | #3 Substrate | #4 Substrate | #5 Substrate |
|---|---|---|---|---|---|---|
| PVC | | 49.173 | 49.096 | 49.805 | 49.042 | 49.800 |
| | PVC | | | | | |
| DIDP | | 20.336 | 20.332 | 19.652 | 19.651 | 19.650 |
| ESO | | 1.230 | 1.229 | 1.960 | 1.960 | 1.230 |
| | Plasticizer | | | | | |
| CaCO3 | | 15.735 | 15.706 | 15.722 | 15.721 | 15.720 |
| | Filler | | | | | |
| MARK 4825 Ba—Zn-1 | | 0.000 | 1.718 | 1.720 | 1.720 | 1.720 |
| MARK 4848 Ba—Zn-2 | | 0.861 | 0.000 | 0.000 | 0.000 | 0.000 |
| MARK 4845 Ba—Zn-3 | | 0.861 | 0.000 | 0.000 | 0.000 | 0.000 |
| | Vinyl Stabilizers | | | | | |
| Perchlorate | | 0.098 | 0.200 | 0.200 | 0.200 | 0.200 |
| | Co-Stabilizer | | | | | |
| Flame retardant- SbO3 | | 1.967 | 1.968 | 1.970 | 1.970 | 1.970 |
| | Flame Retardant | | | | | |
| K-120N Acrylic Process Aid 1 | | 0.000 | 0.739 | 0.000 | 0.000 | 0.750 |
| K-175 Acrylic Process Aid 2 | | 0.738 | 0.000 | 0.000 | 0.000 | 0.000 |
| K120ND Acrylic Process Aid 3 | | 0.000 | 0.000 | 0.000 | 0.750 | 0.000 |
| | Process Aid Polymer-Rheology | | | | | |
| Wax (Montan) | | 0.000 | 0.050 | 0.050 | 0.075 | 0.050 |
| | Lubrication Process Aids | | | | | |
| UV Light Stabilizer | | 0.246 | 0.250 | 0.250 | 0.250 | 0.250 |
| Antioxidant-Thermal | | 0.246 | 0.250 | 0.250 | 0.250 | 0.250 |
| | Generic Stabilizer | | | | | |
| Colorant- TiO2 & Toner | | 7.852 | 7.853 | 7.861 | 7.860 | 7.861 |
| Optical Brightener | | 0.059 | 0.060 | 0.060 | 0.060 | 0.060 |
| | Colorant | | | | | |
| Funcide 1-SB1 | | 0.600 | 0.599 | 0.500 | 0.000 | 0.500 |
| Funcide 2-BP5 | | 0.000 | 0.000 | 0.000 | 0.500 | 0.000 |
| | Biocides | | | | | |
| Total | | 100.0 | 100.0 | 100.0 | 100.0 | 100.0 |

TABLE 2

| Components | Category | Individual Range Lower | Range Upper | Category Lower | Range Upper |
|---|---|---|---|---|---|
| PVC polymer | | 46.00 | 53.00 | | |
| | PVC | | | 46.00 | 53.00 |
| DIDP (phthalate plasticizers) | | 17.00 | 24.00 | | |

TABLE 2-continued

| Components | Category | Individual Range Lower | Range Upper | Category Lower | Range Upper |
|---|---|---|---|---|---|
| ESO | | 0.00 | 2.50 | | |
| | Plasticizer | | | 17.00 | 24.00 |
| CaCO3 | | 12.00 | 17.00 | | |
| | Filler | | | 12.00 | 17.00 |
| MARK 4825 Ba—Zn-1 | | 0.00 | 4.00 | | |
| MARK 4848 Ba—Zn-2 | | 0.00 | 1.50 | | |
| MARK 4845 Ba—Zn-3 | | 0.00 | 1.50 | | |
| | Vinyl Stabilizers | | | 0.00 | 4.00 |
| Perchlorate | | 0.05 | 0.35 | | |
| | Co-Stabilizer | | | 0.05 | 0.35 |
| Flame Retardant- SbO3 | | 1.50 | 5.00 | | |
| | Flame Retardant | | | 1.50 | 5.00 |
| K120N Acrylic Process Aid 1 | | 0.00 | 1.50 | | |
| K-175 Acrylic Process Aid 2 | | 0.00 | 1.50 | | |
| K120ND Acrylic Process Aid 3 | | 0.00 | 1.50 | | |
| | Process Aid Polymer-Rheology | | | 0.00 | 1.50 |
| Wax (Montan Wax OP) | | 0.00 | 0.10 | | |
| | Lubrication Process Aids | | | 0.02 | 0.10 |
| UV Light Stabilizer | | 0.08 | 2.00 | | |
| Antioxidant-Thermal | | 0.08 | 2.00 | | |
| | Generic Stabilizers | | | 0.40 | 2.00 |
| Colorant- TiO2 & Toner | | 7.00 | 10.00 | | |
| Optical Brightener | | 0.04 | 0.12 | | |
| | Color | | | 7.00 | 10.00 |
| Funcide 1-SB1 (in PVC/PVA) | | 0.00 | 0.60 | | |
| Funcide 2-BP5 (in ESO or DIDP) | | 0.00 | 3.00 | | |
| | Biocide | | | 0.00 | 3.10 |
| Total | | 83.7 | 131.2 | 84.0 | 117.0 |

The composition can be extruded on large PVC extruder having a wide die with a 1.5 to 2.0 mm lip opening average. The PVC substrate does not burn, and has only limited lubrication additives. Lubrication additives, especially external waxes, can result in printing problems. The composition extruded onto scrim forms a reinforced composition, where the reinforced composition is suitable as an article of manufacture, where the article of manufacture is a wide format billboard sheeting. A typical construction of billboard sheeting is 4–10 mils of the PVC substrate coated onto a polyester fabric scrim, with 4–10 mils of substrate coated onto the back side of the scrim. The scrim is comprised of a (7 to 24)×(7 to 24) count of 50 to 2000 denier threads. A preferred scrim has a (9)×(9) count of 1000 denier threads. The reinforced composition has a construction that is a sheet comprising of PVC/fabric/PVC. The sheet can be fully annealed to relieve stress, as required. A method for producing the article of manufacture is as follows. The PVC substrate is extrusion coated onto the scrim. The extruder uses a 200 mm 30:1 L/D (length to diameter ratio) barrel. The PVC substrate is coated on the scrim at temperatures from about 370 to about 400° F. (about 188 to about 204° C.). The PVC substrate and scrim are nip squeezed between a rubber roll and steel roll to promote adhesion of the PVC substrate to the scrim. The scrim is preheated to a temperature of 100–250° F. (38–121° C.) prior to coating with PVC substrate. The PVC substrate is extruded from the die onto the scrim at the nip point of a steel roll and a rubber roll. The PVC substrate is on the steel roll side. The nip forces the PVC substrate against the scrim on one side, and the steel roll cools and smoothes the PVC substrate. The process for making billboard sheeting is usually run in two (2) passes, however, it is possible to form the composite sheet in one pass by applying both the face and the back material to the fabric at the same time.

A two pass process for manufacturing a large format digital printing billboard sheet would then consists of the following steps:
 coating 4–10 mils of a PVC substrate extrudate on the pre-heated scrim (100 to 250° F.) on a side of the scrim that faces the steel, where a rate of extrusion of the extrudate is greater than half the rate of movement of the scrim forming a first pass coated scrim;
 annealing the first pass coated scrim at temperature between 180–230° F.;
 cooling the first pass coated scrim;
 rewinding the first pass coated scrim;
 coating the opposing side of the first pass coated scrim with another 4–10 mils of PVC substrate extrudate forming a second pass coated scrim;
 annealing the second pass coated scrim at temperature between 180–230° F.;
 cooling the second pass coated scrim; and
 rewinding the second pass coated scrim.

The unique PVC based substrate is capable of being extruded through exceptionally wide PVC extrusion dies, to produce a white flexible composite sheet which can be printed with ink jet and digital print technology. The composition of the formulation is designed to accept pigment based solvent inks. The composition is weather resistant, impact resistant, flame resistant (NFPA 701 vertical burn), and will pass the requirements of the CSFM (California State Fire Marshall).

The PVC based substrate is acceptable on a wide variety of printing machines and solvent based inks, Nur, Vutech, Signtech, and others, providing acceptable levels of ink adhesion, drying time, and dot gain.

Table 3 lists typical specifications for large format digital printing billboard sheeting using the composition and the process as described in the detailed description. In addition to the properties described above, the sheeting has a very wide functional temperature range. Extending from a low temperature is −65° F. (−55° C.) to a high of about 200° F. (93° C.). The tear strength in the warp direction is 70 lbs (31.1 daN) and in the fill direction 55 lbs (24.4 daN). The puncture resistance via Screwdriver is 35 lbs (15.6 daN) and via ball is 275 lbs (122.2 daN). There was no loss in biocidal resistance as evidence that there is no fungus growth (ASTM G21-21-90).

TABLE 3

Base Fabric:

Weight: 12 ± 0.5 oz/yd 2/406.8 ± 16.95 g\m 2
Gauge: 0.013 ± 0.0010 in./0.033 ± 0.003 cm.
Type of coating: PVC
Physical Specifications:

Tensile Strength:
Grab Warp: 210 Lbs./93 daN
Fill: 175 Lbs./78 daN
Tear Strength:

Butterfly Warp: 70 Lbs./31.1 daN
Fill: 55 Lbs./24.4 daN
Temperature:

Low Temp: −65° F./−54° C.
High Temp: 180/200° F./82/93.33° C.
Flame Resistance:

Time of Afterflame: 2 sec. max./2 sec max.
Length of Char: 10 in. max./25.4 cm max.
Flame Listing:

California State Fire Marshall
NFPA 701, E8U Type 1
Other Properties:

Seam Strength: 100 × 100 Lbs./in./89 × 89 daN/5 cm
Opacity: 90%
High Gloss: 40–50 @ 60%
Fungus Resistance: No Growth (ASTM G21-21-90)
Puncture:

Screwdriver: 35 Lbs/15.6 daN
Ball: 275 Lbs./122.2 daN

SUMMARY OF THE ACHIEVEMENT OF THE OBJECTS OF THE INVENTION

From the foregoing, it is readily apparent that we have invented a composition that is a PVC based substrate having excellent thermal and printing properties, where the composition can be extruded through very wide extrusion dies with so little degradation such that, there is substantially no yellowing, reduced biocidal durability, deteriorated mechanical properties, nor lowered weatherability.

It is also apparent that we have invented a reinforced composition that is a PVC based substrate reinforced with a scrim that has excellent dimensional stability, as well as the properties previously enumerated.

It is also apparent that we have invented an article of manufacture, where the article of manufacture is a wide format billboard sheeting having excellent low temperature performance, mechanical strength, puncture resistance, tear resistance, fungicidal properties and resistance to burning.

It is further evident that we have invented a process for making a full width billboard sheet, where the sheet produced by the process has minimal stress induced curling or puckering, and that the sheet has a smooth uniform surface and thickness with excellent printability.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. An extrudable plastic composition, by weight percent, comprising:

from about 46% to about 53% PVC;

from about 17% to about 24% plasticizer;

from about 12% to about 17% of filler;

from about 7% to about 10% of colorant;

from about 1.5% to about 5% of flame retardant;

from about 1.2% of Ba—Zn to about 4% of Ba—Zn vinyl stabilizer;

from about 0.02% to about 0.1% of lubrication processing aides;

from about 0.4% to about 2% of thermal/UV stabilizer; and from about 0.2% to about 0.4% of perchlorate stabilizer.

2. A composition according to claim 1, further comprising from about 0% to about 3% of biocide.

3. A composition according to claim 1, further comprising from about 0% to about 3% of rheological processing aid(s).

4. A composition according to claim 1, wherein said PVC is a PVC suspension resin.

5. A composition according to claim 1, wherein said plasticizer comprising a diisodecyl phthalate and an epoxidized soybean oil.

6. A composition according to claim 1, wherein said filler is calcium carbonate.

7. A composition according to claim 1, wherein said colorant is a color concentrate comprises $TiO_2$ and a blue toner concentrate.

8. A composition according to claim 2, wherein said biocide comprises 10,10-oxybisphenoxarsine.

9. A composition according to claim 3, wherein said rheological process aid comprises a copolymer of ethyl acrylate and methyl methacryalate.

10. A composition according to claim 1, wherein said flame retardant comprises antimony trioxide.

11. A composition according to claim 1, wherein said lubrication processing aides comprises waxes of partially saponified ester of montanic acids.

12. A reinforced plastic composition comprising:

a.) a PVC;

b.) a plasticizer;

c.) a filler;

d.) a colorant;

e.) a flame retardant;

f.) a Ba—Zn stabilizer;

g.) a thermal stabilizer;

h.) a UV stabilizer;

i.) a perchlorate stabilizer; and j.) a scrim.

13. A composition according to claim 12, further comprising no more than 3% of biocide.

14. A composition according to claim 12, further comprising no more than 3% of rheological process aid.

15. A composition according to claim 12, wherein said PVC is a PVC suspension resin.

16. A composition according to claim 12, wherein said plasticizer comprises a diisodecyl phthalate and an epoxidized soybean oil.

17. A composition according to claim 12, wherein said filler comprises calcium carbonate.

18. A composition according to claim 12, wherein said colorant is a color concentrate comprises $TiO_2$ and a blue toner concentrate.

19. A composition according to claim 13, wherein said biocide comprises 10,10-oxybisphenoxarsine.

20. A composition according to claim 14, wherein said rheological process aid comprises a copolymer of ethyl acrylate and methyl methacryalate.

21. A composition according to claim 12, wherein said flame retardant comprises antimony trioxide.

22. A composition according to claim 12, wherein said lubrication processing aides comprises waxes of partly saponified ester of montanic acids.

* * * * *